(12) United States Patent
Seitz born Müller et al.

(10) Patent No.: US 7,679,843 B2
(45) Date of Patent: Mar. 16, 2010

(54) ADJUSTMENT METHOD, PARTICULARLY A LASER ADJUSTMENT METHOD, AND AN ACTUATOR SUITABLE FOR THE SAME

(75) Inventors: Burkhard Arthur Seitz born Müller, München (DE); Klaus Strol, Gelting (DE); Axel Mehnert, Sunnyvale, CA (US)

(73) Assignee: Finisar Corporation, Sunnyvale, CA (US)

( * ) Notice: Subject to any disclaimer, the term of this patent is extended or adjusted under 35 U.S.C. 154(b) by 1125 days.

(21) Appl. No.: 10/473,941

(22) PCT Filed: Jun. 12, 2002

(86) PCT No.: PCT/DE02/02143

§ 371 (c)(1),
(2), (4) Date: Apr. 13, 2007

(87) PCT Pub. No.: WO02/103417

PCT Pub. Date: Dec. 27, 2002

(65) Prior Publication Data

US 2008/0144195 A1      Jun. 19, 2008

(30) Foreign Application Priority Data

Jun. 15, 2001    (DE) ............................... 101 28 827

(51) Int. Cl.
G02B 7/02       (2006.01)
G02B 6/26       (2006.01)
(52) U.S. Cl. ........................... 359/811; 359/820; 385/52

(58) Field of Classification Search ......... 359/694–822; 385/14–32, 137, 52
See application file for complete search history.

(56) References Cited

U.S. PATENT DOCUMENTS

| | | |
|---|---|---|
| 5,195,155 A | 3/1993 | Shimaoka et al. |
| 5,347,415 A | 9/1994 | Murata et al. |
| 5,537,276 A | 7/1996 | Mukae |
| 5,870,417 A | 2/1999 | Verdiell et al. |
| 5,914,972 A | 6/1999 | Siala et al. |
| 6,154,952 A | 12/2000 | Tangren |

(Continued)

FOREIGN PATENT DOCUMENTS

DE       2918100       11/1980

(Continued)

OTHER PUBLICATIONS

U.S. Appl. No. 10/473,940, filed Oct. 3, 2003, Burkhard Muller.

(Continued)

Primary Examiner—Mohammed Hasan
(74) Attorney, Agent, or Firm—Workman Nydegger (57) ABSTRACT

The invention relates to an adjustment method, especially for adjusting optical or fiber optical components. According to an embodiment of the invention, a first adjustment process is carried out in which, after a cooling process, the regions of the actuator in which the tensile stresses or compressive strains are frozen following the cooling process are brought to a critical temperature in relation to the operational temperature range of the actuator, at least until the flow processes of the material at said critical temperature are largely completed. A second adjustment process is then carried out.

22 Claims, 5 Drawing Sheets

U.S. PATENT DOCUMENTS

| | | |
|---|---|---|
| 7,224,871 B2 * | 5/2007 | Willis .......................... 385/52 |
| 7,389,032 B2 * | 6/2008 | Oguma ....................... 385/136 |
| 7,391,940 B2 * | 6/2008 | Bryan et al. ................... 385/33 |
| 2002/0021480 A1 | 2/2002 | Auracher et al. |
| 2004/0141697 A1 | 7/2004 | Hubner |
| 2004/0190570 A1 | 9/2004 | Hubner |
| 2007/0064761 A1 * | 3/2007 | Togo et al. .................. 372/107 |

FOREIGN PATENT DOCUMENTS

| | | |
|---|---|---|
| DE | 3875078 T2 | 2/1993 |
| DE | 9415437 T2 | 1/1996 |
| DE | 19704502 C1 | 2/1998 |
| DE | 19752028 | 6/1999 |
| DE | 19805849 | 9/1999 |
| DE | 10037975 | 8/2000 |
| DE | 19805849 A1 | 11/2000 |
| DE | 0201380 | 4/2002 |
| EP | 0 373 225 | 6/1990 |
| EP | 0 488 658 A2 | 6/1992 |
| EP | 0 638 895 A1 | 2/1995 |
| EP | 1053576 B1 | 11/2000 |
| EP | 1 186 927 A1 | 7/2001 |
| EP | 1186927 A2 | 3/2002 |
| JP | 57198415 | 12/1982 |
| JP | 59087635 | 5/1984 |
| JP | 57013301 | 1/1998 |
| JP | 2000357309 | 12/2000 |
| WO | WO 01/37019 A | 5/2001 |
| WO | 0145094 | 6/2001 |
| WO | 02084828 | 10/2002 |

OTHER PUBLICATIONS

U.S. Appl. No. 10/473,942, Hubner (claims priority to DE 0201380).

Kazharsky, Oleg, et al., "Broad Continuous Frequency Tuning of a Diode Laser with an External Cavity", Elsevier Science B.V., Optics Communications 137, pp. 77-82, Apr. 15, 1997.

* cited by examiner

ADJUSTMENT METHOD, PARTICULARLY A LASER ADJUSTMENT METHOD, AND AN ACTUATOR SUITABLE FOR THE SAME

BACKGROUND

The invention concerns an adjustment method, particularly for adjusting optical or fiber optical components, with the features of the preamble of patent claim 1. Moreover, the invention concerns an actuator which is suitable for the same and an optical component.

Laser adjustment methods and actuators suitable for the same have been developed in recent times to enable extremely precise adjustment, e.g., of micromechanical components.

The basic principle of laser adjustment consists of heating a predetermined region of an actuator using a high-energy, preferably pulsed laser beam in a short time, in which the thermal expansion of the relevant region is blocked by corresponding further regions of the actuator. In this manner, compression strains build up in this heated region, which result in a plastic deformation of this region upon reaching the yield point. When this region is cooled down after the high-energy laser beam is switched off, the thermal shrinkage of this region is again essentially prevented by the further regions of the actuator. This leads to the build-up of tensile stresses in the previously heated region which lead to a defined deformation of the actuator, in which the adjustment of a component joined to the actuator is enabled in this process.

The basic principle of such an adjustment method is illustrated in FIG. 1. FIG. 1a shows the starting state of a bar 3 made of a suitable material which is restrained between two rigid demarcations 1. At the starting temperature, e.g., room temperature (20° C.), the bar 3 has a length $l_0$. The center region 3a of the bar 3 is heated by a laser beam 5 in a short time.

Figure 1A:
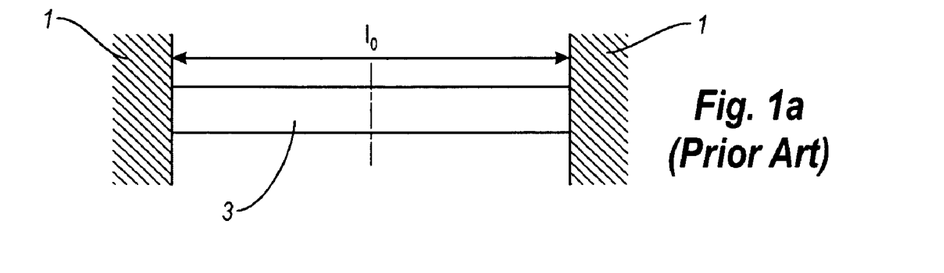
FIG. 1: Schematic representations of the laser beam adjustment method.
Figure 1B:
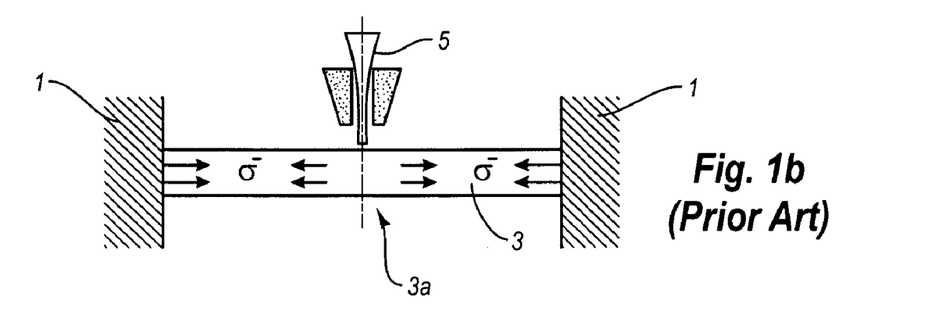

This results in the first place in compressive strains $\sigma^{(-)}$ in the bar 3 since the thermal longitudinal expansion of the bar 3 is blocked by the rigid demarcations 1. In this phase, a negative expansion $\epsilon$ is also customarily defined which corresponds to the compressive strains formed in the bar 3. This phase of the adjustment method is illustrated in FIG. 1b.

Figure 1C:
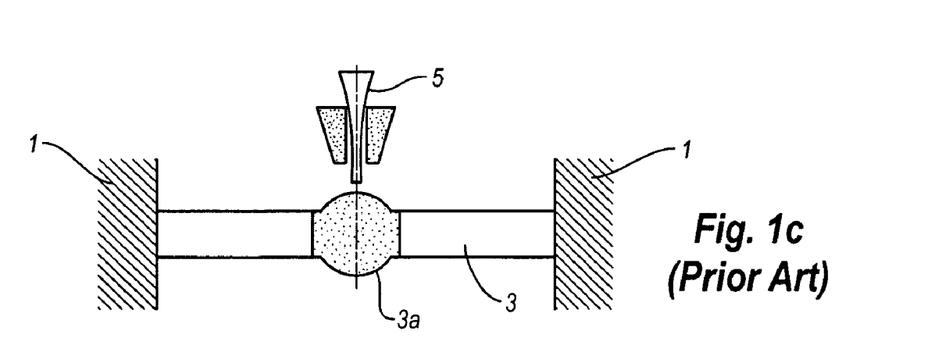
Figure 1D:
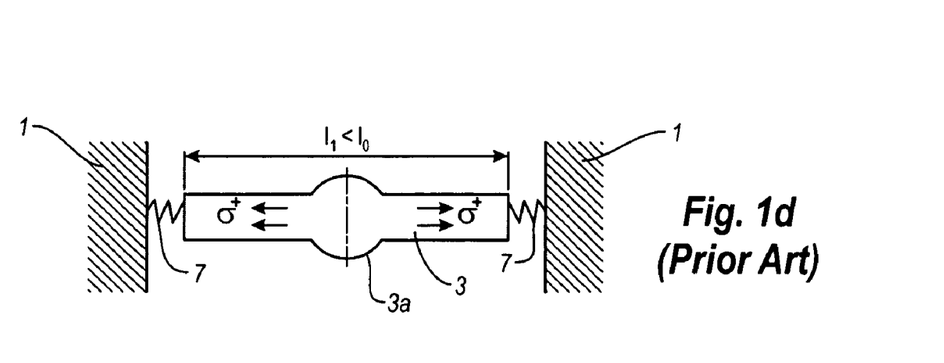

If the compressive strains $\sigma^{(-)}$ exceed the temperature-dependent yield point $\sigma_F$, a plastic deformation of the bar 3 arises in the region 3a. Correspondingly, the compressive strains in the bar 3 are reduced. This situation is illustrated in FIG. 1c.

After the laser beam 5 is switched off, the region 3a of the bar 3 begins to cool off, causing a thermal shrinkage of the bar 3. In this process, tensile stresses $\sigma^{(+)}$ arise in the bar 3 which in actual practice frequently lie in the vicinity of the temperature-dependent yield point $\sigma_F(T)$. This situation is represented symbolically in FIG. 1d because seen in the longitudinal direction of the bar 3 whose ends are joined by means of spring elements 7 to the rigid demarcations 1 . . . . [Note: incomplete sentence in the German original]. The spring forces corresponding to the tensile stresses $\sigma^{(+)}$ cause a defined deformation of the actuator in a practically realized actuator. In this connection, FIG. 1d also shows that the tensile stresses $\sigma^{(+)}$ arise through the shortening of the bar 3 due to the plastic deformation in the region 3a caused during the heating, in which the length of the bar $l_1$ after the adjustment procedure at the starting temperature is smaller than the original length $l_0$ at the starting temperature.

A problem in the previously known adjustment methods consists in that, as was previously mentioned, the tensile stresses frozen in the bar 3 lie relatively close to the yield point $\sigma_F$. The same can apply also to the compressive strains which occur in those regions which block the thermal expansion or rather the thermal shrinkage of the bar. Since micromechanical or optical components or rather subassemblies in actual practice are always specified for a certain temperature range, e.g., a range from −40° C. to +80° C., and must fulfill predetermined requirements for accuracy and long-term stability within the specified range, there results in previously known adjustment methods a maladjustment of the actuator if the adjusted components or rather the subassembly is brought to a temperature in the upper region of the specified range and the original adjustment was carried out at a significantly lower temperature, such as room temperature. This effect is caused by the temperature dependency of the yield point $\sigma_F$, most materials which are suitable for the manufacture of actuators for laser adjustment methods having a yield point which decreases with increasing temperature. If a temperature is reached at which the yield point $\sigma_F$ falls below the value of the frozen-in tensile stresses, this results in a flowing of the material and in a reduction of the tensile stresses to the value of the yield point $\sigma_F$ at the relevant temperature. Naturally, this is associated with a corresponding maladjustment of the actuator which is not acceptable at least for components requiring extremely precise adjustment which must be specified over a wide temperature range.

BRIEF SUMMARY

The underlying object of the invention is therefore to create an adjustment method, particularly for adjusting optical or fiber optical components, with which improved long-term stability of an adjusted actuator or rather a subassembly having such an actuator can be ensured within a predetermined temperature range, it being possible to carry out the method quickly and at a low cost. Moreover, the underlying object of the invention is to create a special actuator for simply carrying out the method and an optical component having an actuator of this sort.

This objective is solved by the invention with the features of patent claim 1, 6 or 17.

The invention is based on the insight that the adjustment of an actuator can be carried out in an advantageous manner in the first place in a first adjustment procedure at an arbitrary temperature, e.g., room temperature, that subsequently at least the essential regions of the actuator (in which stresses are frozen in as a consequence of the first adjustment procedure) can have their tension relieved by heating to a specified temperature, and that subsequently a readjustment of the actuator can be carried out again at an arbitrary temperature, preferably room temperature.

In an embodiment of the method, as regions essential for relieving the tension, all regions in which, after the first adjustment procedure compressive strains or tensile stresses are frozen in, are brought to a critical temperature ($T_k$) with regard to the usage temperature range of the actuator, at least until flow processes of the material are largely concluded at the critical temperature.

In this connection, a critical temperature ($T_k$) is understood to be a temperature at which the yield point has a value such that when passing through the entire usage temperature range, only minor maladjustments of the adjusted actuator can occur which lie within specified tolerances. With conventional actuator materials which have within a specification range a yield point which decreases at higher temperatures, one will choose the critical temperature in the upper region of the specification range or even a temperature lying above its upper limit $T_o$.

According to the preferred embodiment, the second adjustment procedure is carried out by heating and cooling a first subregion of a further adjustment region of the actuator, the further adjustment region being constituted such that in comparison to the first adjustment region, a smaller adjustment effect would be caused if the same amount of energy is supplied. Naturally, the energy of the second adjustment procedure or rather the curve vs. time of the power for heating the relevant region can differ in the second adjustment procedure and can be adapted particularly to the desired adjustment effect or rather adjustment range.

According to an embodiment of the invention, the critical temperature $T_k$ can essentially be chosen to be that temperature within the usage temperature range at which the minimum yield point $\sigma_F$ of the material is attained within the usage temperature range. In this case, it is ensured that within the usage temperature range, no flowing of the material occurs in those regions of the actuator in which internal stresses occur as a result of the adjustment procedure.

The possibility explained above of choosing an even higher temperature assumes in actual practice that a corresponding heating of the essential regions is carried out only locally. This applies at least if the actuator is part of a subassembly in which components are also contained which may be subjected as a maximum temperature to the upper temperature $T_0$ of the planned usage temperature range. The essential regions include those regions which are subject during an adjustment procedure to thermal shrinkage and also those regions which prevent such shrinkage.

In another embodiment of the method, essentially only those regions can be heated to a specified stress-relieving temperature as essential regions in which compressive strains are frozen in after the first adjustment procedure, in which the stress-relieving temperature is chosen such that a thermal expansion of the relevant regions [is] produced by the heating [and] the tensile stresses in those regions in which tensile stresses are frozen in following the first adjustment procedure, are increased above the yield point so that flowing of the material occurs in these regions. In other words, through the heating of the regions with compressive strains and the resultant thermal expansion of these regions, a stretching of the regions with tensile stresses is carried out. The stress-relieving temperature is chosen preferably such that after the tension is relieved during a reheating of all regions in which stresses are frozen in to a critical temperature (cf., in this connection the explanations above), no flow processes and thus no maladjustment of the actuator occurs.

The heating for the actual adjustment procedure and the heating for the heating after the adjustment procedure can take place, for example, using a laser, preferably an Nd:YAG laser or diode laser.

A special actuator with which the method according to the invention can be implemented in a particularly easy manner has a support region for accommodating an element to be adjusted and has at least a first and a second adjustment region, in which the first adjustment region is formed so that when carrying out an adjustment procedure using the first adjustment region, a greater adjustment effect can be obtained than when carrying out a further adjustment procedure using the second adjustment region. Using this "two-stage" design, the result is that even when passing through the entire permissible temperature range only a maladjustment of the second adjustment region occurs which lies within permissible limits. This can be achieved in that also when adjusting the second adjustment region an "over-adjustment" occurs, i.e., an adjustment such that the stresses frozen in the essential regions during heating and an associated flowing of the material in the essential regions cause in the first place a deformation of the actuator in a direction which leads to an "improvement" of the adjustment position.

According to an embodiment of the invention, the first adjustment region includes at least a double bridge. This structure has the advantage of a significantly greater adjustment effect or setting range compared to a single bridge.

In a further development of the invention, the second adjustment region includes a single bridge.

In an embodiment of the invention, the first adjustment region (having the greater adjustment effect) can be provided lying closer to the support region of the actuator than the second adjustment region (having the lesser adjustment effect). If angular adjustments of the actuator are carried out with the adjustment regions, i.e., the actuator is bent by an adjustment procedure (and not only shortened in the direction of the respective bridge), then only a relatively small, undesirable offset in the lateral direction is produced during adjustment procedures with the first adjustment region, besides the desired angular adjustment, since these two adjustment effects are not present in a decoupled manner in an actuator of this sort. In any case, the second adjustment region produces only relatively small lateral adjustment movements as a consequence of the smaller adjustment effect compared to the first adjustment region.

In the preferred embodiment, the first adjustment region is provided so that a plane passing through it, which extends preferably perpendicularly to the axis of the actuator, essentially coincides with a plane which forms the basis for the adjustment procedure of an element arranged and to be adjusted in the support region. In this manner, a lateral offset is reduced to zero for the desired angular adjustment.

In a further embodiment, the actuator has an essentially hollow-cylindrical casing in which the first and second adjustment regions are formed, in which each adjustment region preferably includes three bridges distributed over the circumference. Using an actuator of this sort, a tilting of the element to be adjusted which is, for example, held centrally in the casing or in a floor or cover wall can be performed about two axes (tilting movements about two axes) as well as an axial adjustment (through uniform shortening of all three bridges). Moreover, a lateral adjustment can take place if the bridges are positioned so that the tilting movements produce sufficient movements of the element to be adjusted (on a circular track). This is the case particularly if the bridges have a sufficient axial distance from the element to be adjusted.

In one embodiment, the actuator is manufactured from an essentially planar element which includes a central region emanating from which a plurality (preferably three or six) of arms extend radially outwards, the arms being bent essentially at right angles to the central region. An actuator of this sort can replace a tube actuator, but it is substantially easier and more cost-effective to manufacture.

In the simplest case, three arms can be provided at preferably an angular spacing of 120°, in which a first and a second adjustment region is provided in each arm.

In another embodiment, six arms can be provided at an angular spacing of 60°, in which a first and a second adjustment region is provided in every second arm. If all of the arms are bent in the same direction and the longitudinal sides of the arms are joined in the bent state, preferably welded or soldered such that they form an essentially hollow-cylindrical wall, a tube actuator results in practical terms.

An actuator which is sealed with regard to the essentially cylindrical wall can be manufactured by forming the bridges as webs having a greater thickness than the regions provided to the side of the webs, in which the thickness of the regions provided to the side of the webs is chosen compared to the thickness of the webs so that a sufficient adjustment effect is obtainable during an adjustment procedure. The bridges or rather webs are thus delimited to the side not by breakouts or recesses but by a wall having a small thickness. If adjustment regions are formed in the tube actuator manufactured from a planar part with six arms only in every second arm, then in the remaining arms, preferably on the same axial position as the adjustment regions, regions with thinner walls can be provided in order to enable easier and better defined deformation of the actuator and thus a defined adjustment procedure.

This measure involving provision of regions with thinner walls which do not significantly hinder a deformation of the actuator during an adjustment procedure (and are bent or folded in this process), instead of breakouts between regions of the actuator which should be offset or tilted with respect to one another, is generally applicable to every geometric structure of an actuator. In this manner, actuators that are impermeable at least in certain regions, and particularly gas-impermeable actuators, can be manufactured. As was mentioned above, a tube actuator can be manufactured with an impermeable wall. If the front sides of the tube actuator are also closed, an element to be adjusted that is held in the tube actuator can be shielded against ambient influences. Here, a tube actuator can be manufactured preferably from one or more planar elements. With a planar design, thin wall parts can be easily manufactured, e.g., using stamping techniques. For example, a tube actuator could also be manufactured, instead of using the previously described bending of arms of a corresponding planar part, from an essentially rectangular planar part, which is correspondingly bent or "rolled" for this purpose. The joining of the edges can take place through welding or soldering.

In another embodiment, when using a starting element having a central region and six arms, in each case three arms can be bent in alternating order in each case in the opposite direction by essentially 90°. An actuator of this sort can accommodate in the central region an element to be adjusted and also be joined on the ends of the three respective arms in each case to an element to be adjusted or rather a support element in which an element to be adjusted is held. If in each case two adjustment regions are provided in each arm, then the three elements can be adjusted to one another. Here, in the first place an adjustment of two elements can take place which are held in an end region of the three arms of one side of the actuator or rather in its central region. In the next step, an adjustment of the element held in the end region of the other three arms can then take place.

An optical component according to the invention includes a support element and an actuator on which an optical element to be adjusted is arranged. It can be adjusted using an actuator with respect to the support element or to a further optical element joined to it.

Within the meaning of the present invention, an optical element is understood to be any element which serves to guide or otherwise influence light, such as optical waveguides, lenses, filters, mirrors or the like.

In an embodiment, the support element can have an accommodation region for the essentially hollow-cylindrical wall of the actuator or the bent arms of the actuator, the accommodation region preferably including a stopping face for the front side of the hollow-cylindrical wall or the front sides of the bent arms. Thus, the actuator can be placed in a defined axial position on the support element. In this position, the two parts can be rigidly joined, for example, bonded, welded or soldered.

To mount and to adjust a further optical element, the support element can have a second accommodation region for a further actuator on whose support region a further optical element is provided, the further actuator including the first actuator and the optical element arranged on it.

Using an actuator which has six arms of which in each case three were bent in opposite directions by approx. 90°, in which on each of the arms a first and a second adjustment region is provided, an optical component can be implemented with two support elements, in which in each case one of the support elements is joined to in each case the three arms bent in one direction. In each support element, an optical element can be held. In the central region of the actuator, a further optical element can be held which can be adjusted relative to the support elements. In this manner, for example, an optical coupler or passive multiplexer can be implemented. In this case, in the support elements in each case one or more optical waveguides are held and in the central region one or more filters, mirrors or the like.

Further embodiments of the invention follow from the dependent claims.

BRIEF DESCRIPTION OF THE DRAWINGS

The invention is described hereafter in greater detail based on the figures shown in the drawing. The figures are as follows.

DETAILED DESCRIPTION

Figure 2:
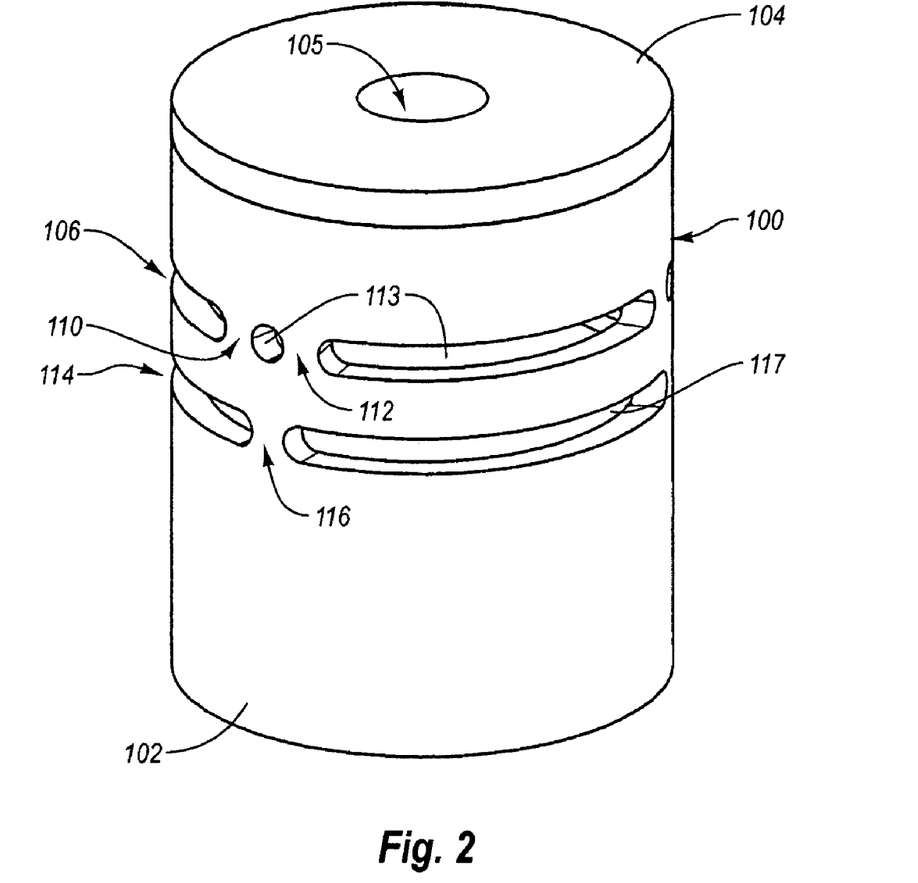
FIG. 2: An embodiment of a tube actuator according to the invention.

FIG. 2 shows a tube-shaped actuator 100 (tube actuator) for the laser beam adjustment method described in the introduction which includes a hollow-cylindrical casing or rather wall 102 and a cover 104. In the cover 104, a circular breakout 105 is provided which allows a light beam (not shown) to pass through in the longitudinal axis of the actuator 100. On the inner or outer side of the cover 104, an optical element to be adjusted, e.g., a lens, a mirror or reflection or transmission filter (not shown) can be arranged.

In the hollow-cylindrical wall 102, a first adjustment region 106 is provided which includes three double bridges 108 which in each case have an angular spacing of 120°. In this manner, by shortening a double bridge 108 or rather by shortening a bridge 110, 112 of the double bridges 108, a tilting of the cover 104 can be achieved, the reason being that between the bridges 110, 112, breakthroughs 113 are provided so that upon shortening the bridges 110, 112 of a double bridge 108, the bridges 110, 112 of the two other double bridges 108 are stressed only on bending. Using the double bridges 108, an element to be adjusted that is arranged on the cover can be tilted about two axes. Simultaneously, the element to be adjusted is naturally also slightly displaced laterally (essentially parallel to the cover 104) since the tilting axes do not lie in the plane of the element to be adjusted. However, the smaller the axial spacing of the double bridges 108 from the cover 104, the smaller the lateral offset upon tilting of the cover through the shortening of at least one of the bridges 110, 112 of the double bridges 108. Since the lateral and tilting movements do not take place in a decoupled manner, in the actuator according to FIG. 2 the double bridges 108 are backed up relatively close (in the axial direction) to the cover so that during an adjustment procedure the lateral offset of the element to be adjusted is negligibly small compared to the angular offset.

If in the actuator according to FIG. 2 in an adjustment procedure all of the double bridges 108 are shortened in the same manner, an axial adjustment of the element to be adjusted can also be achieved. For example, the focus of a lens or the width of a laser beam can be axially adjusted.

After the first adjustment procedure using the double bridges 108, which can take place, for example, at room temperature, the individual bridges 110, 112 of the double bridges 108 are heated so that the frozen-in stresses are reduced. Since the yield point of most materials decreases at higher temperatures, a heating of the bridges 108 (and of the surrounding regions in which stresses are frozen in) can be carried out up to the maximum temperature of the specification range so that during subsequent heating or cooling of the bridges 110, 112 to an arbitrary temperature within the specification range, no flowing of the material occurs and the actuator [does not become] maladjusted in these regions.

After this reduction of the stresses in the bridges 110, 112, which of course is associated with a maladjustment, a readjustment using the second adjustment region 114 can be carried out in the actuator according to FIG. 2. The second adjustment region 114 includes three simple bridges 116, which again are arranged in essentially the same plane (perpendicular to the axis of the actuator) at an angular spacing of 120°. Between the bridges 116, breakthroughs 117 are provided in the casing 102. The principle of adjustment using the simple bridges 116 of the second adjustment region 114 corresponds to the principle described above in connection with the first adjustment region 106. During an adjustment of the simple bridges 116, they are not heated over the entire cross-section but rather only in a (preferably middle) subregion. The subregions which are not heated beyond the yield point assume upon heating of the relevant region beyond the yield point the tensile stresses and after the cooling of this region the compressive strains. Since the adjustment effect which is obtainable using a simple bridge 116 is substantially smaller than the adjustment region which is attainable using a double bridge, a finer adjustment can take place using the second adjustment region. In addition, the effect of a maladjustment which took place during a subsequent heating of the essential regions of the second adjustment region to a higher temperature compared to the temperature at which the adjustment occurred is very small.

A repeated "tempering" in order to reduce the stresses of the simple bridge can thus be dispensed with. Of course, it is still possible when adjusting the bridges 116 of the second adjustment region to carry out a certain "overadjustment", i.e., to cause an excess of adjustment range for the element to be adjusted so that upon reduction of the stresses by means of a subsequent tempering process in the first place an "improvement" of the adjustment position of the element to be adjusted results.

Figure 3A:
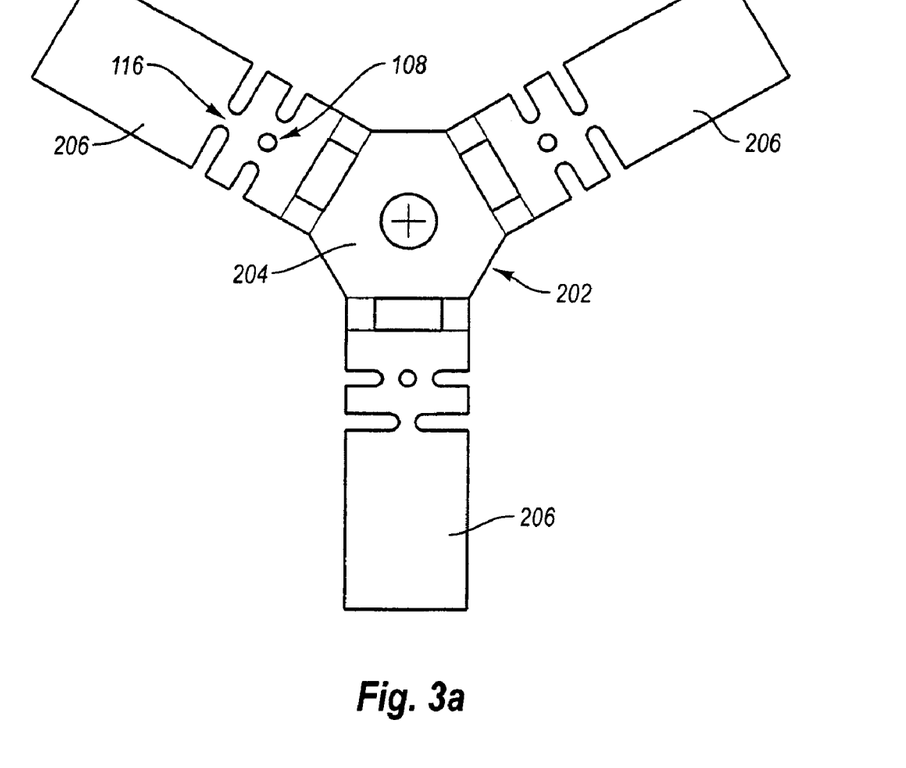
FIG. 3: An embodiment of a three-arm actuator according to the invention.
Figure 3B:
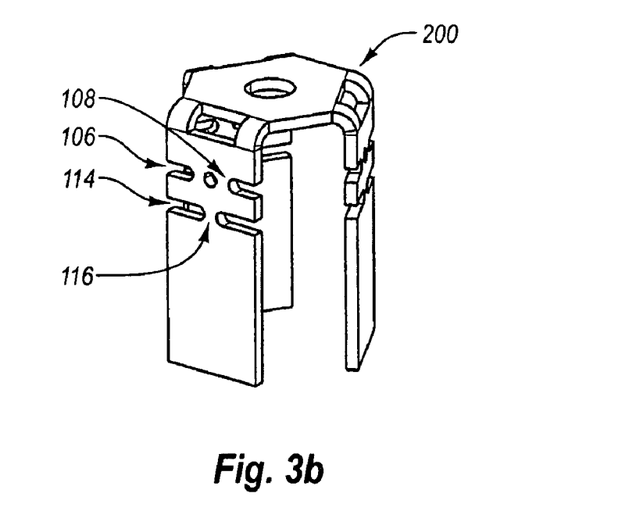

FIG. 3 shows a three-arm actuator 200 which corresponds largely to the tube actuator 100 in terms of its function. The actuator 200 is manufactured from a planar element 202, which can be manufactured, for example, as a stamped part. The element 202 includes a central region 204 and three radially extending arms 206. The central region 204 has again a central circular breakthrough 208 which corresponds in terms of its function in the completed actuator 200 to the breakthrough 105 in the cover 104 of the actuator 100. To manufacture the actuator 200, following a stamping out of the element 202, the arms 206 are bent roughly at right angles so that the three-arm actuator 200 shown in FIG. 3b is created. Each arm 206 has a double bridge 108 and a simple bridge 116 which correspond in terms of their functions largely to the functions of the corresponding elements which were described above in conjunction with the actuator 100 according to FIG. 2.

Compared to the actuator according to FIG. 2, the actuator 200 according to FIG. 3 has the advantage that it is much easier to manufacture.

A modification of the actuator shown in FIG. 2, which is not shown, can be manufactured from a stamped part which has six arms with an angular spacing of 60° instead of three arms. If the six arms are bent to one side and the lateral edges of the arms joined, e.g., soldered or welded, a tube actuator is produced according to FIG. 2. However, the distinction is that the actuator manufactured from the stamped part is substantially simpler and thus more cost-effective to manufacture.

Figure 4:
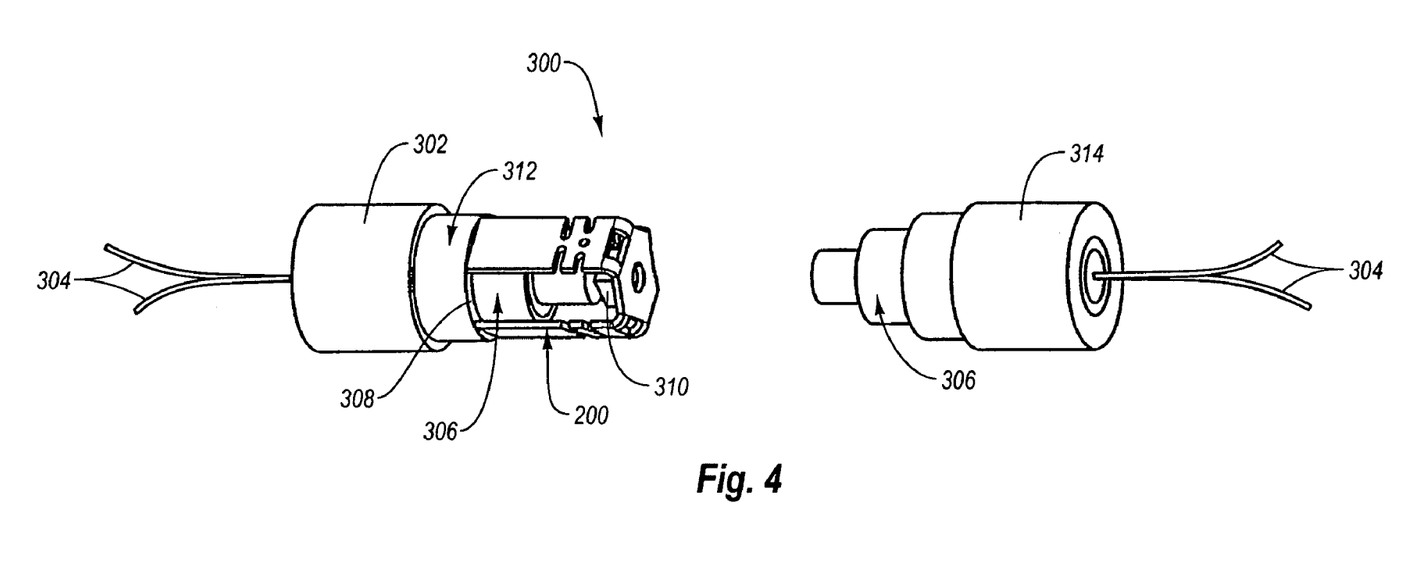
FIG. 4: A passive optical multiplexer according to the invention.

FIG. 4 shows an optical component 300 which can be, for example, an optical coupler or a passive optical multiplexer. The component 300 includes a first support element 302 in which two optical waveguides 304 are held. The support element 302 has an accommodation region 306 for an actuator which in the embodiment according to FIG. 4 is a three-arm actuator 200 according to FIG. 3. The accommodation region 306 is a cylindrical prolongation on the front side of which the front sides of the optical waveguides 304 are accessible. A shoulder on the rear end of the accommodation region 306 forms a stop 308 for the front-side ends of the arms of the actuator 200. Thus, the actuator 200 can be placed in a defined axial position on the support element 302. Then, the actuator can be rigidly joined to the support element, for example, bonded, soldered or welded. On the inner side of the central region of the actuator 200, an optical element 310 to be adjusted, e.g., a filter or a partially transparent mirror, is arranged. Using the actuator 200, the optical element 310 can be adjusted in terms of its angular position or rather its axial position with respect to the front surfaces of the optical waveguides 304.

The support element 302 has, moreover, a further accommodation region 312 for a further actuator not shown in greater detail. It can also be a three-arm actuator 200 according to FIG. 3 which is fastened on the support element 302 as was described previously for the first actuator. The further actuator is used to hold and adjust a further support part 314 in which two optical waveguides 304 are also held. The support element 314 can be formed identically to the first support element 302. The first holding region 306 can be fastened in the centric region of the further actuator, which is not shown.

Figure 5:
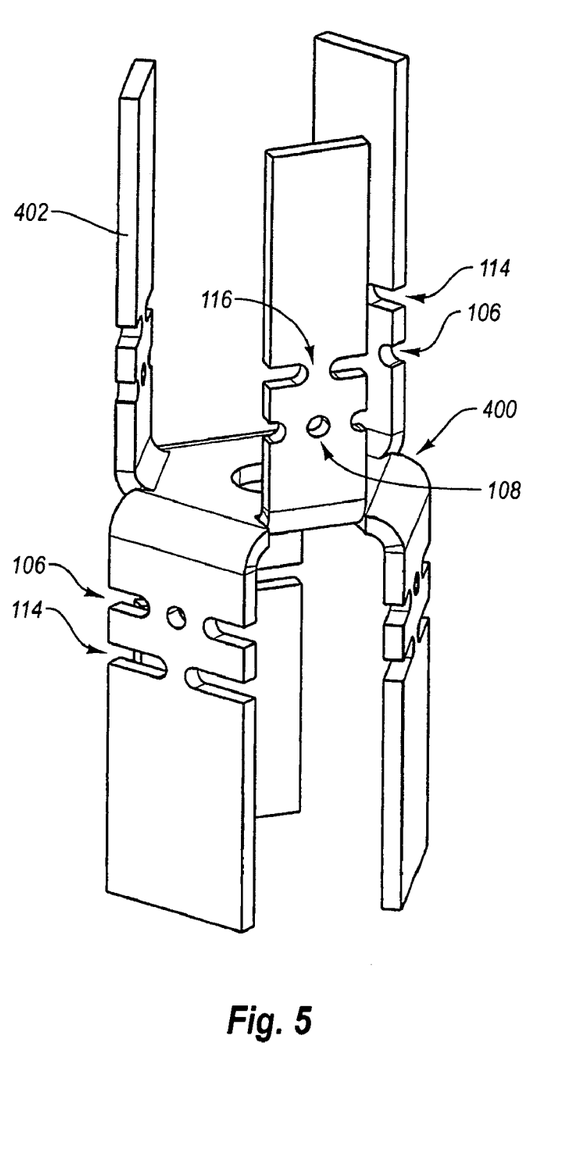
FIG. 5: An embodiment of a six-arm actuator according to the invention.

In the place of the two actuators which are used in the optical element according to FIG. 4, a single actuator 400 according to FIG. 5 can also be used. It is manufactured from a stamped part having six arms 402 which are bent alternately upwards or downwards. Each of the arms 402 has a double bridge 106 and a single bridge 114 whose function was described previously. In each case three arms on each side of the actuator 400 are joined to in each case a support element 302, 314. In the central region of the actuator 400, the optical element to be adjusted can be held. The adjustment then takes place in the previously described manner. Of course, one of the two support elements can also be joined in the first place to the actuator and then the element held in the central region of the actuator can be adjusted with respect to the front surfaces of the relevant optical waveguides 304. Then, the second support element can be joined to the remaining three arms of the actuator and the second support element adjusted with respect to the already adjusted parts.

The invention claimed is:

1. A method for adjusting optical or fiber optic components, comprising the acts of:
performing a first adjustment procedure, including:
locally heating a first region of an actuator such that compressive stresses arise in the first region, which, upon reaching a yield point of the material of the first region, results in plastic deformation of the first region;
cooling the first region, such that the first region is shortened, resulting in a defined geometric change of the actuator, wherein tensile stresses arise in the first region of the actuator and, in a second region of the actuator, the compressive stresses are frozen; and
reheating the first region to a specified temperature such that stresses in a portion thereof are relieved; and
performing a second adjustment procedure.

2. The method of claim 1, wherein the second adjustment procedure comprises locally heating and cooling a third region of the actuator, wherein the third region is positioned, such that, in comparison to the first region, a smaller adjustment effect is caused if the same amount of energy is supplied.

3. The method of claim 1, wherein, after the first adjustment procedure, the first region is brought to a critical temperature with regard to the usage temperature range of the actuator, at least until flow processes of the material are substantially concluded at the critical temperature.

4. The method of claim 3, wherein the critical temperature is selected to be essentially the temperature within the usage temperature range at which a minimum yield point of the material is attained within the usage temperature range.

5. The method of claim 3, wherein the material of the selected subregion has a yield point that drops monotonically with increasing temperatures within the usage temperature range.

6. The method of claim 5, wherein the critical temperature is selected to be essentially the temperature corresponding to an upper limit of the usage temperature range.

7. The method of claim 1, wherein locally heating the first region is performed using an Nd:YAG laser.

8. The method of claim 1, wherein locally heating the first region is performed using a diode laser.

9. An actuator for adjusting an optical or a fiber optics component, comprising:
a support region for accommodating the component to be adjusted;
a first adjustment region having a double bridge; and
a second adjustment region having a simple bridge, wherein the first adjustment region produces a greater adjustment effect than a second adjustment region when a heating and cooling adjustment procedure is performed using the first and second adjustment regions.

10. The actuator of claim 9, further comprising means for heating a first bridge of the double bridge, wherein thermal expansion of the first bridge of the double bridge is constrained by the second bridge of the double bridge.

11. The actuator of claim 10, further comprising means for heating a first subregion of the simple bridge, wherein a second subregion of the simple bridge constrains thermal expansion of the first subregion of the simple bridge.

12. The actuator of claim 9, further comprising a substantially cylindrical body having an end at which the support region is positioned.

13. The actuator of claim 12, wherein the first adjustment region and the second adjustment region are positioned in the cylindrical body.

14. The actuator of claim 13, wherein the first adjustment region is positioned to be closer to the support region than is the second adjustment region.

15. The actuator of claim 13, wherein the first adjustment region defines a plane that is substantially perpendicular to an axis of the cylindrical body and substantially coincides with a plane that forms the basis of an adjustment procedure that can be performed using the first adjustment region.

16. The actuator of claim 13 wherein:
the first adjustment region includes three double bridges positioned about a circumference of the cylindrical body; and
the second adjustment region includes three simple bridges positioned about the circumference of the cylindrical body.

17. A method of manufacturing an actuator for use with an optical or a fiber optics component, comprising:
obtaining a substantially planar element having:
a central region; and
a plurality of at least three arms that are connected to and extend radially away from the central region; and
bending the arms to form substantially right angles with respect to the central region, the bent arms defining a first adjustment region that defines a plane substantially parallel to the central region and a second adjustment region substantially parallel to the central region,
wherein the first adjustment region produces a greater adjustment effect than a second adjustment region when a heating and cooling adjustment procedure is performed using the first and second adjustment regions.

18. The method of claim 17, wherein the plurality of at least three arms comprises exactly three arms at an angular spacing of 120°.

19. The method of claim 18, wherein each of the plurality of at least three arms includes a double bridge that defines the first adjustment region and a simple bridge that defines the second adjustment region.

20. The method of claim 17, wherein the plurality of at least three arms comprises exactly six arms at an angular spacing of 60°.

21. The method of claim 20, wherein bending the arms comprises:
bending the six arms in the same direction; and
connecting longitudinal sides of the six bent arms to form a hollow-cylindrical wall of the actuator.

22. The method of claim 21, wherein alternating arms of the six arms include a double bridge that defines the first adjustment region and a simple bridge that defines the second adjustment region.

* * * * *